United States Patent [19]

Greenberg et al.

[11] Patent Number: 5,596,460
[45] Date of Patent: Jan. 21, 1997

[54] SYSTEM AND METHOD FOR ENCODING A SERVO ADDRESS

[75] Inventors: Richard Greenberg; John C. Purkett, both of Rochester, Minn.

[73] Assignee: International Business Machines Corporation, Armonk, N.Y.

[21] Appl. No.: 364,561

[22] Filed: Dec. 27, 1994

[51] Int. Cl.$^6$ .............................. G11B 5/596; G11B 5/09
[52] U.S. Cl. .......................... 360/78.14; 360/48; 360/49
[58] Field of Search ................................ 360/40, 48, 49, 360/75, 78.04, 78.14

[56] References Cited

U.S. PATENT DOCUMENTS 4,977,472  12/1990  Volz et al. ................. 360/49
5,418,657  5/1995   Machado et al. .......... 360/40
5,455,721  10/1995  Nemazie et al. .......... 360/48

*Primary Examiner*—Won Tae C. Kim
*Assistant Examiner*—Regina Y. Neal
*Attorney, Agent, or Firm*—Robert Sokohl; Matthew J. Bussan

[57] ABSTRACT

A servo address is encoded in a disk drive system having at least one disk for storing data. A servo address associated with a sector in a track, or cylinder, on a surface of a disk and comprised of a sector number, a track number, and in multiple disk systems, a head number is encoded into the encoded servo address. Encoding the servo address saves disk storage space because the encoded servo address uses fewer bits than a conventional servo address while still enabling the disk drive system to locate positions on the disk.

6 Claims, 6 Drawing Sheets

SYSTEM AND METHOD FOR ENCODING A SERVO ADDRESS

BACKGROUND OF THE INVENTION

1. Field of the Invention

The present invention relates generally to the field of disk drives or direct access storage devices (DASD). In particular, the present invention relates to encoding a servo address to contain more information in fewer bits.

2. Related Art

A direct access storage device (DASD) stores information for later retrieval on a magnetic or electro-optical medium typically referred to as a disk. A DASD may comprise one or more disks having one or both surfaces used to store information. The information, or data, is written onto the disks in concentric tracks. The data is retrieved from and stored in the tracks via read/write heads. Some read/write heads have separate read elements and separate write elements. Others use the same element to perform both operations.

In order to accurately access the data, servo information is written onto the disks to provide positioning information for the read/write heads. Ordinarily, the servo information is written into the tracks along with the data. In a multiple disk storage environment, one entire surface of a storage disk may be dedicated to servo information. This one surface is referred to as a servo surface. One read/write head known as a servo head accesses the servo surface to read the position information stored thereon. Since the servo head is in a fixed relationship relative to the other read/write heads, the position of the servo head can be used to indicate the position of the read/write heads.

An alternative to a dedicated surface for servo information is a "sector" servo pattern. In this scheme, pie-shaped wedges of servo information are interweaved between sections of data. The servo information is incorporated into the individual data tracks on the data surfaces of the disk drive by dividing the data tracks into a plurality of smaller fields, or sectors. Because disks are used as random access memory in many applications, such as personal computers, related information may not always be written in consecutive sectors in the individual tracks. In addition, as old data is removed and new data added, it is not always possible to write new data in adjacent sectors or even adjacent tracks. Because related information may be scattered in several different sectors on the disk, it is important for the disk drive to be able to quickly and accurately access individual tracks and individual sectors of each track.

One method of providing sector positioning uses a counter which continuously monitors sector position once an initial position has been established. In this scheme, the counter is reset once per revolution at a predefined index mark on each servo track. The counter is incremented as sector marks which indicate the beginning of individual data sectors pass under the servo head. Independently of the sector counter, another counter is used to continuously monitor track position. This track counter is bidirectional. It is reset at a predefined track zero position of the servo head and is incremented or decremented as the head crosses individual servo tracks.

The sector counter together with the track counter provide a method for accurately identifying locations on the servo surface. If, however, because of system noise or other perturbations the sector count or track count become corrupted, subsequent locations will be incorrectly identified until the disk is resynchronized. For this reason, this method (known as relative position sensing) is unreliable when used without an independent method of location verfication.

One method for independently verifying the location is to precede each data sector on each data track with a sector identification (ID) field which contains identifier information unique to that sector over the entire drive. A typical identifier includes fields for the track number, the sector number, and for a DASD with multiple data heads, the head number. The sector ID may also contain other information related to media defects and redundancy information for error detection. During operations for reading or writing data, the disk controller reads the sector ID of each data sector as it is encountered and applies various tests to the information contained therein, including comparison of the identifier which was read to the identifier which was expected. If the various tests are passed and the identifier read matches the identifier expected, then the disk controller reads from or writes to the subsequent data portion of the sector. Because each data sector is uniquely and independently identified, the incorrect identification of any data sector will not affect the correct identification of any subsequent data sector. This method of location verification is reliable.

Another method for independently verifying the sector location is to place the identifier from the sector ID into the servo information area. This method is used in systems such as IBM's No-ID™ Sector Format. In such a system, the sector ID preceding a data sector is eliminated from the disk. Instead, portions of the sector ID are stored in solid-state memory or other fields within the sector. In order for the servo controller to properly determine the location of the sectors, the identifier portion is placed in a servo address field of the servo information area which previously contained just the track, or cylinder, number stored as a Grey code.

One problem associated with both theses schemes is that the identifier, also referred to as a servo address, occupies storage area that would otherwise be available for recording data. This becomes especially troublesome as the track densities increase and disk sizes decrease. As track densities increase, larger track numbers, which require larger field widths on the disk, are required to uniquely identify each track. Smaller disks place a premium on disk space available for data. What is needed is a position verification method which reduces the amount of disk space required to store the servo address.

SUMMARY OF THE INVENTION

The present invention is a system and method for encoding information identifying each sector on a disk in to an encoded servo address requiring fewer bits of disk storage space. The encoded servo address is determined from a sector number, a track number, and a head number. The encoded servo address allows independent verification of the position of the head with respect to the surface of the disk.

One feature of the present invention is that the encoded servo address is stored in fewer bits than conventional servo addresses. Conventional servo addresses include a track number stored in Grey code and a separate sector identification field. By encoding the servo address, more space is available on the surface of the disk to store data.. The encoding achieves this space at the expense of an ambiguity in absolute disk position. This ambiguity is resolved by monitoring a position of the head with respect to the disk.

Another feature of the present invention is that it can be used to replace the index mark used to identify the first sector inside a track. This is accomplished by detecting a non-uniform transition in the encoded servo address from sector to sector within a given track. For example, the encoded servo address may be increased by a uniform amount from one sector to the next within a given track. However, the servo address transitions by a different amount between the last sector and the first sector in a track. This non-uniform transition is easily detected and can be used to indicate the location of the first sector in a track, replacing the index mark used in previous systems.

The foregoing and other objects, features and advantages of the invention will be apparent from the following more particular description of preferred embodiments of the invention, as illustrated in the accompanying drawings.

BRIEF DESCRIPTION OF THE FIGURES

The present invention is described in reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The preferred embodiment of the invention is discussed in detail below. While specific components and configurations are discussed, it should be understood that this is done for illustration purposes only. A person skilled in the relevant art will recognize that other components and configurations may be used without parting from the spirit and scope of the invention.

System Overview

The present invention is a system and method for encoding a head number, a track number, and a sector number, which uniquely identify a sector within a disk drive system, into a single encoded servo address requiring less disk space than storing each number individually. For purposes of illustration, the invention is described in terms of a magnetic disk drive system. This is done for purposes of illustration only. A person skilled in the art will recognize that the invention may be used in other applications such as optical disk drives.

Figure 1:
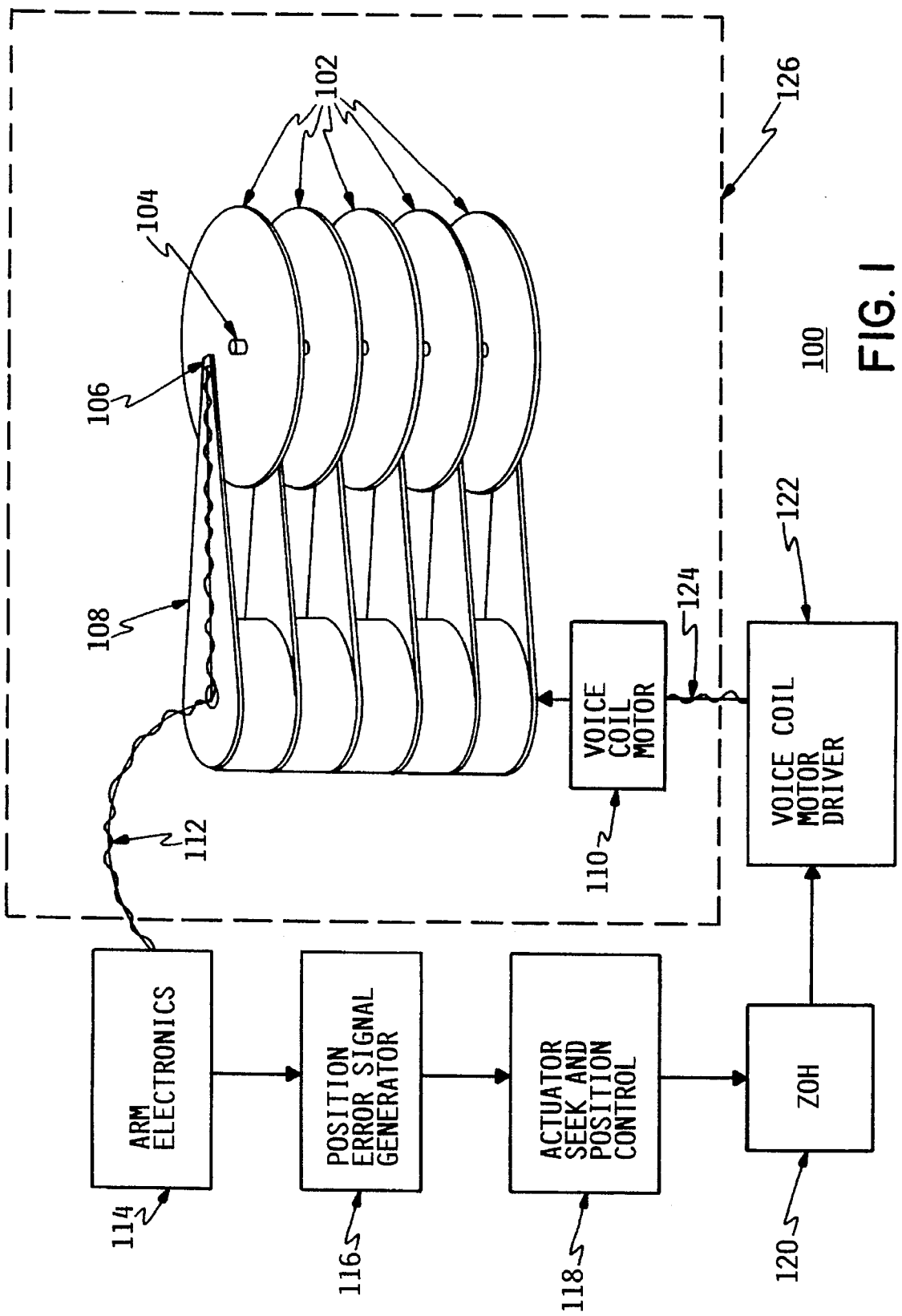
FIG. 1 shows a block diagram of one embodiment of a disk drive implementing the present invention.

FIG. 1 is a block diagram showing a disk drive system 100 for storing data. Disk drive system 100 is comprised of one or more disks 102 mounted rotatably on a disk spindle 104. A disk spindle motor (not shown) rotates all of disks 102 simultaneously via disk spindle 104.

Each surface of disk 102 may be used to store information. Associated with each information storing surface of disk 102 is a read/write head 106 mounted on an arm 108. Read/write head 106 may have a single transducer that can write and read information. Alternatively, read/write head 106 may have separate transducers for each of these operations. Each of the arms 108 is attached to a voice coil motor 110. Voice coil motor 110 receives signals via a driver signal carrier 124 from a voice coil motor driver 122. Voice coil motor 110 responds to the signals by rotating, causing arms 108 to change position, which, in turn, allow read/write heads 106 to read from and write to desired locations on disks 102.

Each read/write head 106 is used for reading from and writing to disk 102. Each read/write head 106 is held closely adjacent to a corresponding surface of disk 102 by a corresponding arm 108. Each read/write head 106 sends signals based on data stored on the surface of disk 102 to an arm electronics module 114 via a head signal carrier 112. Arm electronics module 114 receives the signals from read/write head 106, amplifies and filters the signals, and sends them to a position error generator 116.

Position error generator 116 receives the filtered and amplified signal from arm electronics module 114 and develops a position signal as read from disk 102. Position error generator 116 outputs this position error signal to an actuator seek and position control module 118.

Actuator seek and position control module 118 is a multipurpose microprocessor which, in the preferred embodiment, calculates velocities in addition to other processing associated with controlling disk drive 100. Actuator seek and position control module 118 receives the position error signal from position error generator 116 and compares it to a desired position. Based on the comparison, actuator seek and position control module 118 outputs a signal to a zero order hold (ZOH) 120 so that the position as read by read/write heads 106 will more closely match the desired position or velocity at the next sample time.

Zero order hold (ZOH) 120 receives an input signal from actuator seek and position control module 118 and outputs a signal to voice coil motor driver 122. The output of ZOH 120 is maintained at a certain level until a next input is received, similar to a digital to analog converter with hold capability. Voice coil motor driver 112 then outputs a current to voice coil motor 110 in response to the output signal from ZOH 120. As previously mentioned, this allows read/write head 106 to be positioned radially to desired locations on the surface of disk 102.

In the preferred embodiment, a housing 126 encloses the disks 102 and the components associated with read/write heads 106 including arms 108 and voice coil motor 110 as shown in FIG. 1. Alternate embodiments may include additional components from disk drive system 100 in housing 126 as well.

Figure 2:
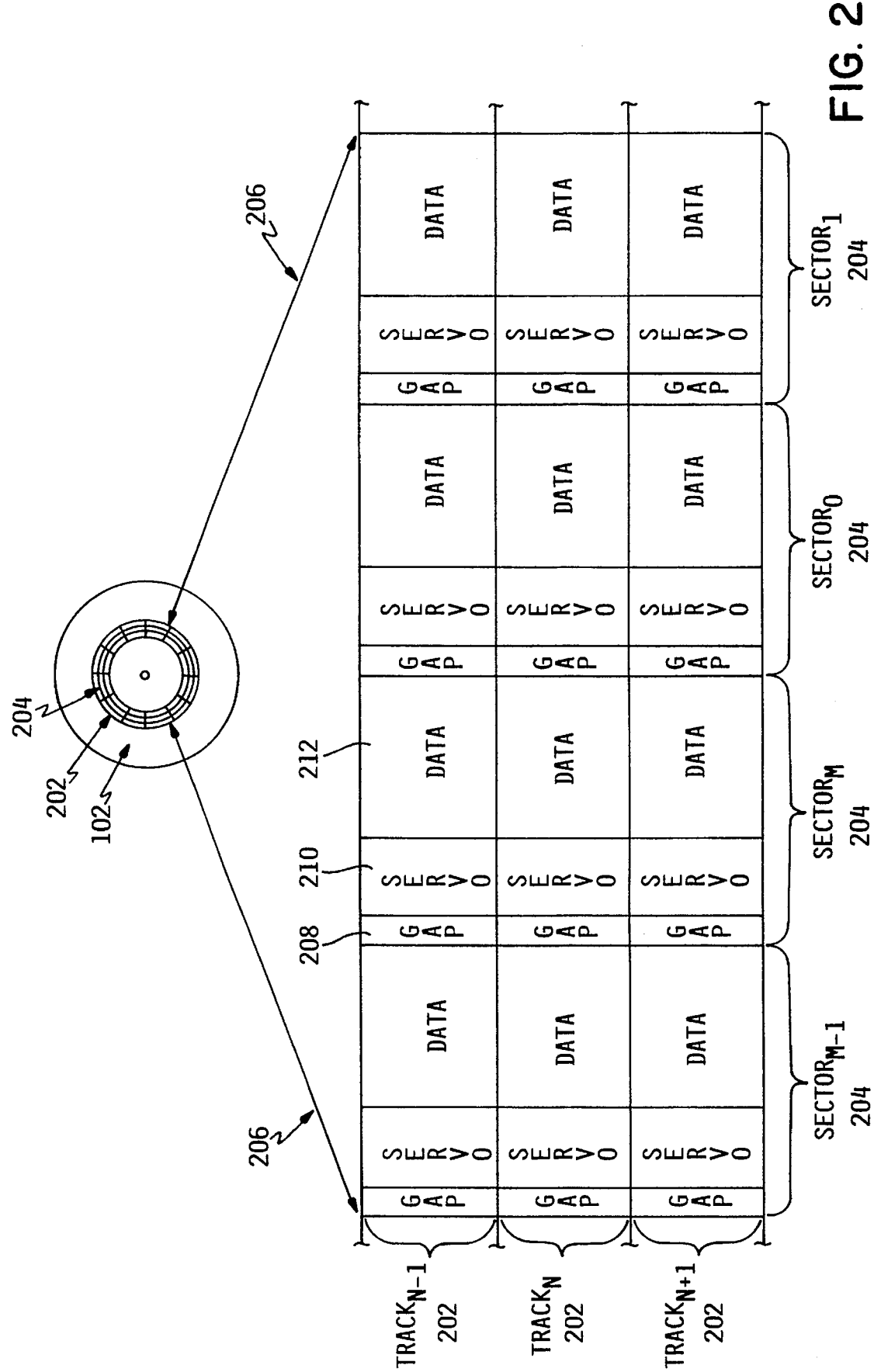
FIG. 2 demonstrates one embodiment of the general organization of the information contained on a disk.

FIG. 2 demonstrates the organization of information on a surface of disk 102. Disk 102 is divided into a plurality of concentric tracks 202. Disk 102 may contain many hundreds to several thousands of tracks 202 depending on disk size, track density, head sensitivity, and head positioning accuracy. Track 202 is sometimes referred to as a cylinder because in a disk drive system 100 having several disks 102, a "track" on the surface of one disk 102 forms a "cylinder" when viewed with respect to each disk 102 on disk spindle 104. Thus, "track" is used when referring to a track on a single disk 102 and "cylinder" is used when referring to a track on multiple disks 102 on disk spindle. Both terms refer to a concentric structure for storing data located at a radius on the surface of disk 102. However, the terms "track" and "cylinder" are used rather loosely in the art. In the remaining discussion, the term "track" will be used for clarity to describe this structure regardless of whether referring to one or many disks 102.

FIG. 2 includes an exploded view 206 of a section of several tracks 202 located on the surface of disk 102. Exploded view 206 shows sections of tracks 202 as straight sections for ease of depiction. In reality tracks 202 are curved. Exploded view 206 includes three tracks 202, hereinafter referred to as $track_{n-1}$, $track_n$, and $track_{n+1}$, respectively. In this illustration, each of $track_{n-1}$, $track_n$, and $track_{n+1}$ is further divided into M+1 sectors 204, hereinafter referred to as $sector_0$, $sector_1$, $sector_2$, . . . , $sector_{M-1}$, and $sector_M$. (Only $sector_{M-1}$, $sector_M$, $sector_0$, and $sector_1$ are shown.)

Each sector is also broken down into fields characterized by the information stored within them. For example, in $track_{n-1}$, $sector_M$, there are three fields: a gap field 208, a servo information field 210, and a data field 212.

Gap field 208, also known in the art as write recovery field, is an area on the disk allowing read/write head 106 to be able to read the next servo information field 210 following a write operation. For example, if a write operation had been performed in $sector_{M-1}$, $track_{n-1}$, read/write head 106 (shown in FIG. 1) must transition during gap 208 to read servo information field 210 in $sector_M$, $track_{n-1}$.

Figure 3:
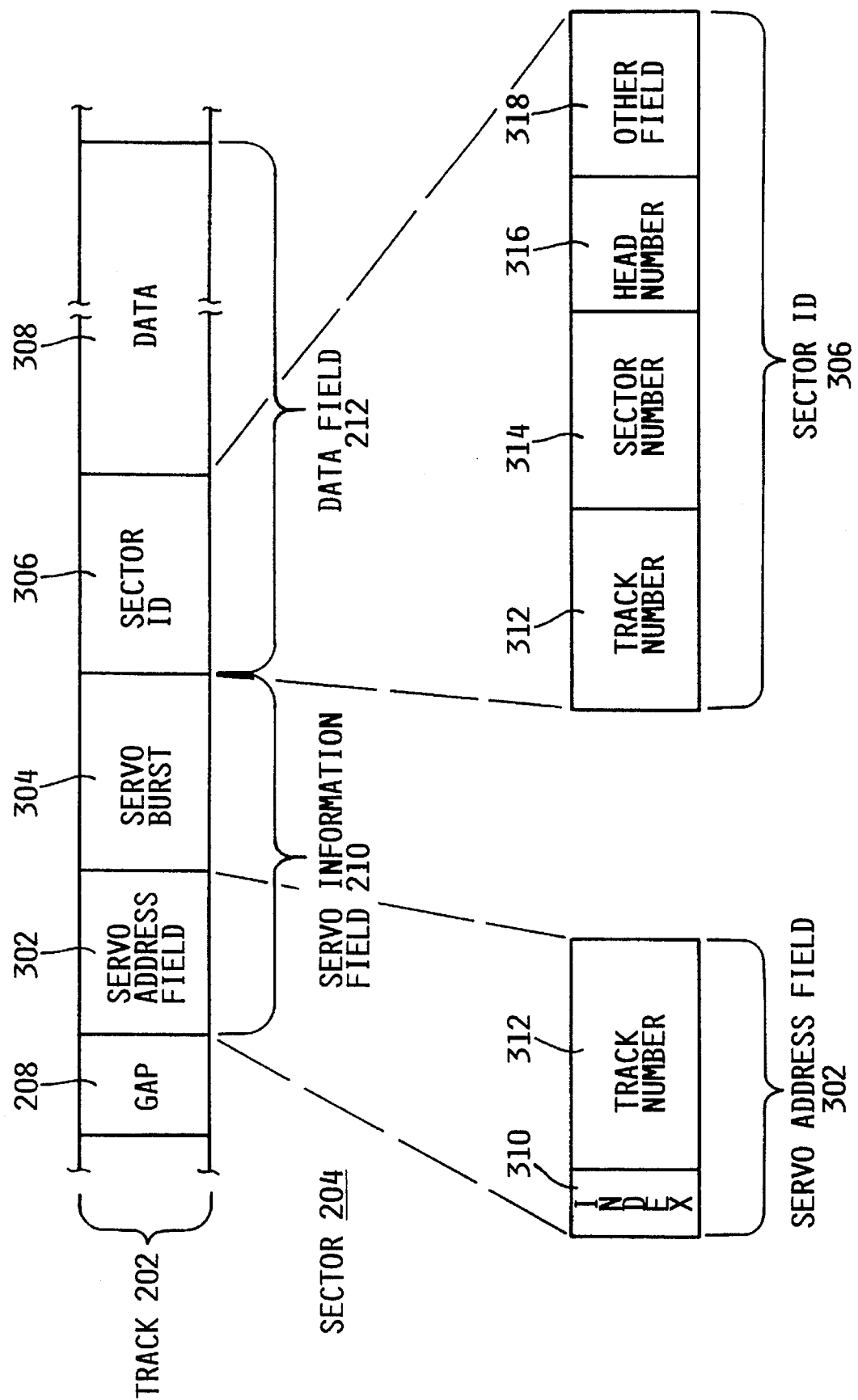
FIG. 3 illustrates the organization of information contained on a disk for a disk drive embodiment implementing a sector format having a data sector ID field.

FIG. 3 illustrates, generally, a common embodiment of sector formatting. As shown therein, servo information field 210 essentially contains two types of information: a servo address field 302 and a servo burst 304. Servo address field 302 contains coarse head positioning information for locating track 202 on disk 102. Typically, servo address field 302 is a track number 312 associated with track 202. For example, a disk 102 using this method of sector formatting would have the value n−1 in each servo address field 302 of each of $sector_0$ through $sector_M$ in $track_{n-1}$. Similarly, the value n would be in each servo address field 302 of each $sector_0$ through $sector_M$ in $track_n$. In other words, servo address field 302 has the same value for all sectors 204 in a given track 202. Servo address field 302 also typically contains an index mark 310 which is an additional bit to identify $sector_0$. For example, index mark 310 is set to 1 for $sector_0$ and set to 0 for all other sectors 204 in track 202. Index mark 310 allows disk drive system 100 to maintain count of sectors 204 in track 202 as disk 102 rotates.

Servo burst 304 contains fine head positioning information for locating tracks 202 on disk 102. Several methods are well known in the art for implementing this fine positioning including amplitude servo bursts or phase-encoded servo bursts, depending on the demodulation system. Both servo address field 302 and servo burst 304 enable read/write head 106 to maintain a proper position over a specific track 202 to accurately read from and write to disk 102.

Following servo information field 210 is data field 212. Data field 212 contains two types of information: a sector identification (ID) 306 and data 308. Sector ID 306 contains a track number 312, a sector number 314, a head number 316, and an other field 318. Track number 312, sector number 314, and head number 316 uniquely identify sector 204 on disk 102 for verification that the subsequent data 308 is indeed the target for a read or write operation. Other field 318 contains flags for logical sectors and error correction codes which are well known in the art and not the subject of the present invention. Because of all the information included in sector ID 306, the disk space required can be quite extensive. In fact, in many popular disk drives, sector ID 306 can utilize up to ten percent of all usable disk space. Note that track number 312 occurs in both sector ID 306 and servo address field 302 and is therefore redundant.

Figure 4:
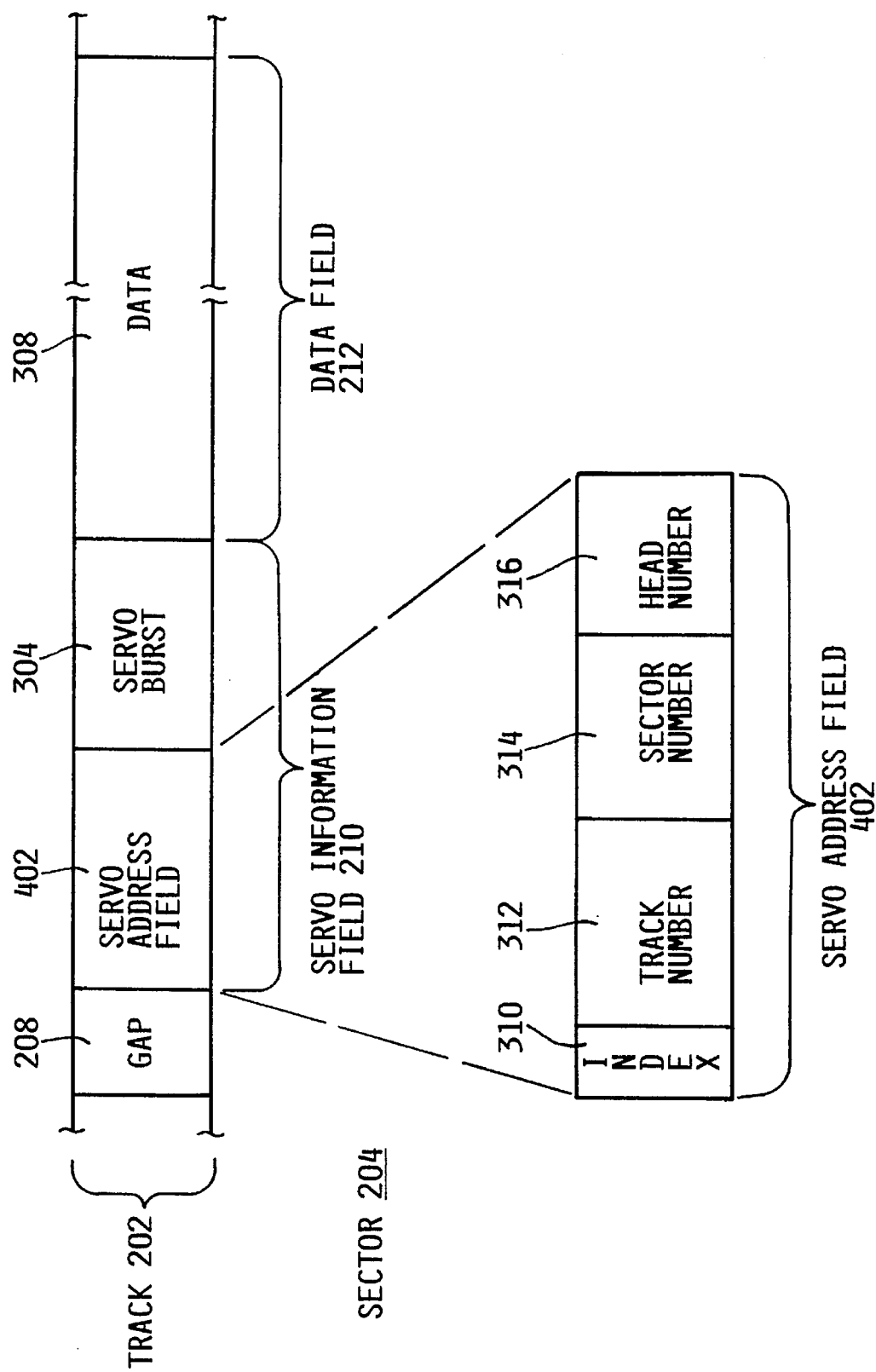
FIG. 4 illustrates the organization of information contained on a disk for a disk drive embodiment implementing a "No-ID" sector format.

FIG. 4 illustrates another embodiment of sector formatting which eliminates much of the information contained in sector ID 306 from disk 102 and stores it in solid state memory instead. This type of sector formatting is known as "No-ID". In this format, a sector 204 includes a gap 208, a servo information field 210, and a data field 212 as in the above described formatting scheme. Servo information field 210 includes a different servo address field 402 as compared with servo address field 302, as well as a servo burst 304. Servo address field 402 includes an index mark 310, a track number 312, a sector number 314, and a head number 316. Servo information field 210 is followed by servo burst 304 as previously discussed. Following servo information field 210 is data field 212. Data field 212 in a No-ID format does not include a sector ID 306. Rather, the entire data field 212 is comprised of data 308.

In the two aforementioned sector formatting methods, track number 312, sector number 314, and head number 316 are stored as independent values within either sector ID 306 or servo address field 402. As described above, much of this information is redundant either because the information is contained elsewhere on disk 102, as in the case of track number 312 in servo address field 302 and sector ID 306; or is repeated, as in the case of head number 316 repeatedly stored in every sector 204 on disk 102 and track number 312 repeatedly stored in every sector 204 in the same track 202.

Figure 5:
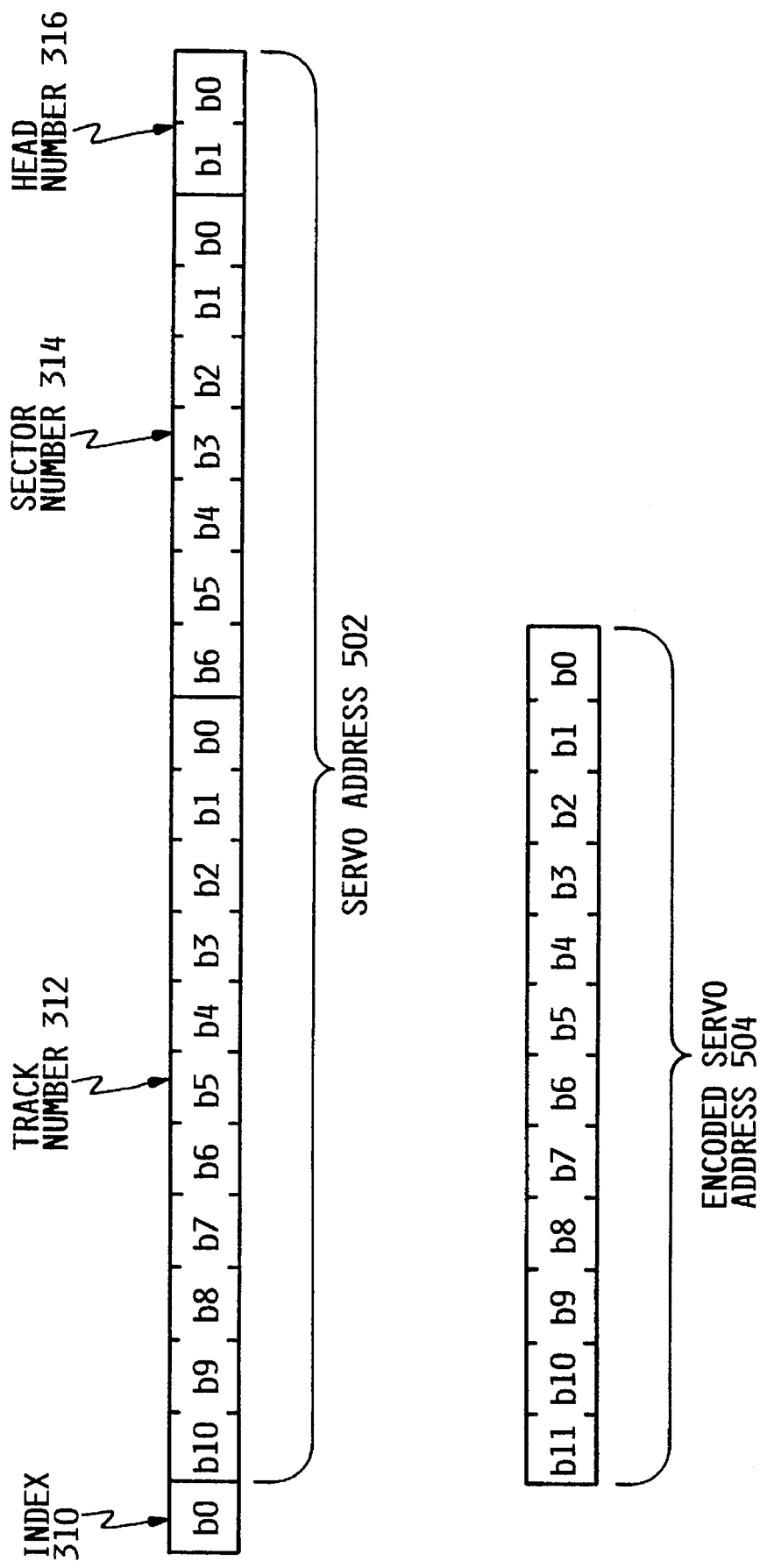
FIG. 5 contains a comparison of a typical servo address and an encoded servo address according to the present invention.

The present invention eliminates redundant information by encoding track number 312, sector number 314, and head number 316 into an encoded servo address 504 as illustrated in FIG. 5. For ease of discussion, track number 312, sector number 314, and head number 316 will be referred to collectively as "servo address" regardless of whether they are being stored in sector ID 306 or servo address field 402. In the preferred embodiment of the present invention, an encoded servo address is computed from a servo address using the following encoding equation:

Encoded Servo Address=Track Number+((Head Number+1)*(Sector Number+1)).

One is added to each of the head number and sector number in the encoding equation above for two reasons. First, some integer is required to be added to both of these number to ensure a non-zero result after the multiplication. Otherwise, for $head_0$ or $sector_0$, the encoded servo address would be equal to the track number which results in the inability to discriminate between sectors. For example, on $head_0$ all sectors would have an encoded servo address of the track number regardless of the sector number. Second, adding an integer other than one generates larger values for the resulting encoded servo address. Larger values require more bits of disk space. Thus, adding one provides the optimal result in terms of disk space while still allowing discrimination between sectors.

An example best illustrates the usefulness of the present invention. Table I illustrates a typical servo address field 302 for a disk drive system 100 having 2 heads, 7 tracks, and 6 sectors. As noted earlier, servo address field 302 contains index mark 310 and track number 312. Table I specifically illustrates track number 312 as it changes across sectors 204 and heads 106. From Table I, it is readily apparent that servo address field 302 only changes as the track number changes. For the same track number, each servo address field 302 in a track 202 contains the same information regardless of changes in head or sector numbers. As a further redundancy, the track number is included with the sector number and head number in sector ID 306.

Table II illustrates a servo address encoded according to the present invention for the same disk drive system 100 with 2 heads, 7 tracks, and 6 sectors. Several important aspects of the present invention are illustrated in reference to Table II. First, the encoded servo address changes for each sector in a track. For example, for $track_2$, $head_0$, the encoded servo address has a value of 3 for $sector_0$ and has a value of 8 for $sector_5$. Thus, by knowing the encoded servo address, sector number 314, and head number 316, track number 314 can be determined using the above encoding equation.

TABLE I

TYPICAL SERVO ADDRESS

| Track Number | Sector Number | | | | | |
|---|---|---|---|---|---|---|
| | 0 | 1 | 2 | 3 | 4 | 5 |
| Head 0 | | | | | | |
| 0 | 0 | 0 | 0 | 0 | 0 | 0 |
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| 4 | 4 | 4 | 4 | 4 | 4 | 4 |
| 5 | 5 | 5 | 5 | 5 | 5 | 5 |
| 6 | 6 | 6 | 6 | 6 | 6 | 6 |
| Head 1 | | | | | | |
| 0 | 0 | 0 | 0 | 0 | 0 | 0 |
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| 4 | 4 | 4 | 4 | 4 | 4 | 4 |
| 5 | 5 | 5 | 5 | 5 | 5 | 5 |
| 6 | 6 | 6 | 6 | 6 | 6 | 6 |

Second, the encoded servo address changes by a different amount for each adjacent sector based on the head on which the sector resides. For example, for $track_2$, $head_0$, the encoded servo address changes by 1 between $sector_0$ and $sector_1$, while for $track_2$, $head_1$, the encoded servo address changes by 2 between $sector_0$ and $sector_1$. Thus, by knowing the amount of change in value of encoded servo addresses between adjacent sectors, disk drive system 100 can verify that the proper head is being read.

TABLE II

ENCODED SERVO ADDRESS

| Track Number | Sector Number | | | | | |
|---|---|---|---|---|---|---|
| | 0 | 1 | 2 | 3 | 4 | 5 |
| Head 0 | | | | | | |
| 0 | 1 | 2 | 3 | 4 | 5 | 6 |
| 1 | 2 | 3 | 4 | 5 | 6 | 7 |
| 2 | 3 | 4 | 5 | 6 | 7 | 8 |
| 3 | 4 | 5 | 6 | 7 | 8 | 9 |
| 4 | 5 | 6 | 7 | 8 | 9 | 10 |
| 5 | 6 | 7 | 8 | 9 | 10 | 11 |

TABLE II-continued

ENCODED SERVO ADDRESS

| Track Number | Sector Number | | | | | |
|---|---|---|---|---|---|---|
| | 0 | 1 | 2 | 3 | 4 | 5 |
| 6 | 7 | 8 | 9 | 10 | 11 | 12 |
| Head 1 | | | | | | |
| 0 | 2 | 4 | 6 | 8 | 10 | 12 |
| 1 | 3 | 5 | 7 | 9 | 11 | 13 |
| 2 | 4 | 6 | 8 | 10 | 12 | 14 |
| 3 | 5 | 7 | 9 | 11 | 13 | 15 |
| 4 | 6 | 8 | 10 | 12 | 14 | 16 |
| 5 | 7 | 9 | 11 | 13 | 15 | 17 |
| 6 | 8 | 10 | 12 | 14 | 16 | 18 |

Third, the encoded servo address can also be used to encode an index mark 310. As previously discussed, index mark 310 is a bit used to indicate $sector_0$ in a given track, i.e., index mark 310 is set to 1 in servo address field 302 or servo address field 402 for $sector_0$ in $track_n$, and index mark 310 is set to 0 for all other sectors in $track_n$. In the present invention, $sector_0$ can be identified by searching for the non-uniform change in the value of the encoded servo address between $sector_M$ and $sector_0$ in a given $track_n$. For example, for $track_2$, $head_1$, the encoded servo address changes by 2 between all adjacent sectors except between $sector_M$ and $sector_0$ where the encoded servo address changes by −10. This non-uniform change is easily detected and is used in the preferred embodiment to eliminate the need for an index mark 310. Sectors 204 can be counted from the non-uniform change to verify the sector number.

Finally, the present invention reduces the amount of disk space required to store a servo address. FIG. 5 illustrates the reduction in field widths obtained by using the present invention. For purposes of this illustration, a typical disk drive having 2000 tracks, 128 sectors, and 4 heads is assumed. FIG. 5 shows a conventional servo address 502 used to identify sectors for the example disk drive and an encoded servo address 504 according to the present invention. Servo address 502 includes index bit 310, track number 312, sector number 314, and head number 316. Index bits 310 requires 1 bit. Track number 312 requires 11 bits to store track numbers ranging from 0 to 1999 (i.e., 2000 tracks<$2^{11}$=2048). Sector number 314 requires 7 bits to store sector numbers ranging from 0 to 127 (i.e., 128 sectors=$2^7$=128). Head number 316 requires 2 bits to store head numbers ranging from 0 to 3 (i.e., 4 heads=$2^2$=4). In all, 21 bits are required to store unencoded servo address 502.

In contrast, the number of bits required to store encoded servo address 504 is only 12. This number is arrived at by determining the number of bits required to store the result of the following equation:

Maximum Value=Number of Tracks+(Number of Heads * Number of Sectors)

Using the numbers for the example disk drive yields a maximum value of 2512 which can be stored in 12 bits (i.e., 2512<$2^{12}$=4096). Thus, the encoded servo address can be used to save a significant amount of disk space by reducing the number of bits required to store the same information.

However, the present invention introduces ambiguity with respect to an absolute position of the head with respect to the surface of the disk. Particularly, several sectors not in the same track may have the same encoded servo address. For example, from Table II, the encoded servo address for $head_0$, track$_2$, sector$_0$ is '3'. This is the same as the encoded servo addresses for head$_0$, track$_1$, sector$_1$ and head$_0$, track$_0$, sector$_2$ as well as head$_1$, track$_1$, sector$_0$. Thus, the encoded servo address alone will not absolutely determine a position on the surface of a disk within the disk drive system. However, the encoded servo address along with a relative position of the head with respect to the disk will allow the ambiguity to be resolved. For example, the encoded servo address along with a sector number and a head number will allow determination of a track number associated with the track from which the encoded servo address was read.

In order to do this, the present invention must maintain the relative position of the head with respect to the disk as well as identify which head is being used. This is accomplished by determining a sector number. The present invention determines the sector number by counting sectors in a track. The sector number is incremented within a track as each individual sector passes under the head and is reset once per revolution at the index mark. In the preferred embodiment, the index mark is identified as a non-uniform transition in the encoded servo address.

Once the sector number and a head number associated with the head being read are determined, the encoded servo address can be used to determine the track number. Specifically, the track number is determined using the following equation:

Track Number=Encoded Servo Address−(Head Number+1)*(Sector Number+1).

Once the track number is determined, the ambiguity in the absolute position of the head with respect to the surface of the disk is resolved. This facilitates locating a particular sector within a track on a surface of the disk prior to performing read and write operations on data.

Figure 6:
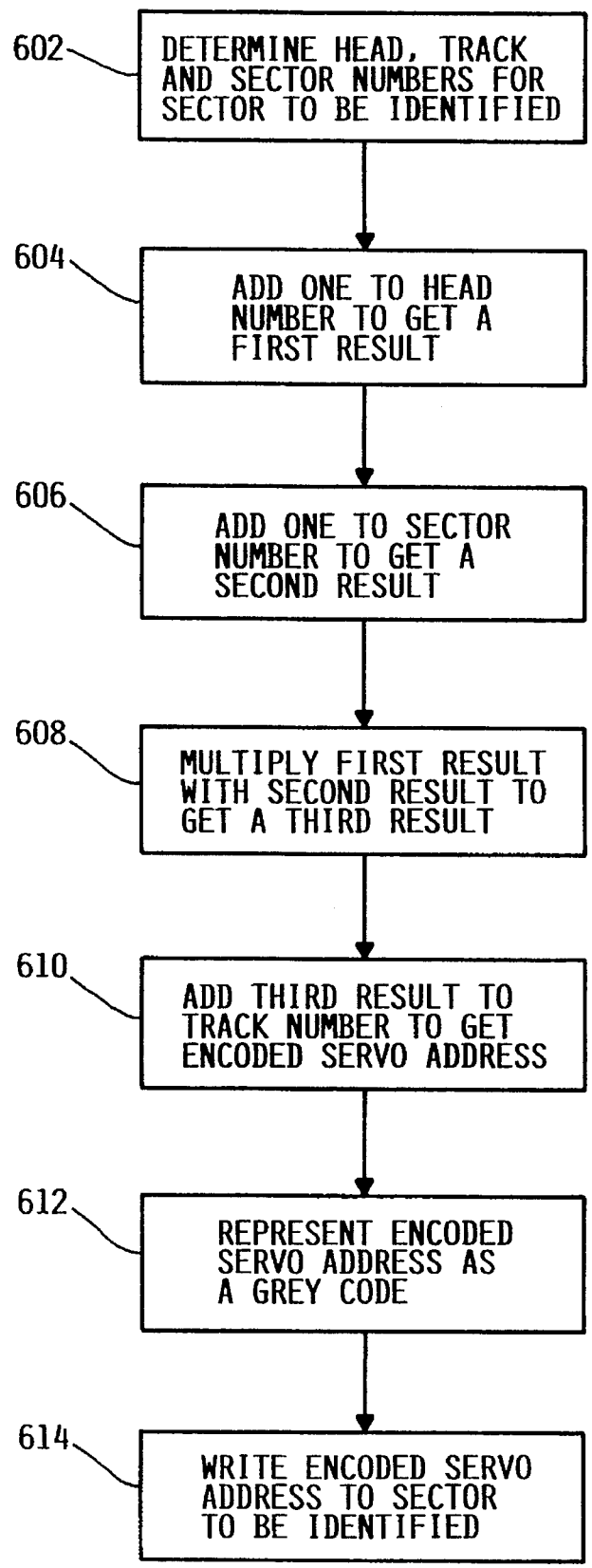
FIG. 6 illustrates a flowchart of the encoding performed according to the present invention.

FIG. 6 illustrates a preferred embodiment of the method used to encode a track number 312, a sector number 314, and a head number 316 into an encoded servo address 504. In a step 602, track number 312, sector number 314, and head number 316 are determined for the particular sector 204 to be identified. In a step 604, one is added to head number 316 to obtain a first result. In a step 606, one is added to sector number 314 to obtain a second result. In a step 608, the first result obtained in step 604 and the second result obtained in step 606 are multiplied together to obtain a third result. In a step 610, the third result obtained in step 608 is added to track number 312 to obtain encoded servo address 504. In a step 612, encoded servo address 504 is converted into a grey code using techniques well known in the art. In a step 614, encoded servo address 504, represented as a grey code, is written to disk 102 in the particular sector 204 to be identified.

While the invention has been particularly shown and described with reference to preferred embodiments thereof, it will be understood by those skilled in the art that various changes in form and details may be made therein without departing from the spirit and scope of the invention.

What is claimed is:

1. A method for locating a desired track on a disk surface having a plurality of concentric tracks, each track having at least one sector, each sector having a servo address stored therein, the method comprising the steps of:

a) determining a sector number of a sector within a track;

b) reading an encoded servo address from said sector; and c) using said encoded servo address together with said sector number to locate the desired track, wherein said step c) comprises:

1) adding a first integer to said sector number to obtain a first result;

2) subtracting said first result from said encoded servo address to obtain a track number; and 3) using said track number to determine if the desired track is located.

2. A method for locating a desired track on a disk surface having a plurality of concentric tracks, each track having at least one sector, each sector having a servo address stored therein, the method comprising the steps of:

a) determining a sector number of a sector within a track;

b) reading an encoded servo address from said sector;

c) using said encoded servo address together with said sector number to locate the desired track; and d) before step b), determining a head number associated with the disk surface containing the desired track; wherein said step c) comprises:

1) adding a first integer to said head number to obtain a first result;

2) adding a second integer to said sector number to obtain a second result;

3) multiplying said first result and said second result to obtain a third result;

4) subtracting said third result from said encoded servo address to obtain a track number; and 5) using said track number to determine whether the desired track is located.

3. A disk drive for storing data, comprising:

a) a housing;

b) at least one disk rotatably mounted within said housing, said disk having
1) a surface for storing data,
2) a plurality of concentric tracks located on said surface,
3) at least one sector located within said track, and
4) a servo address computed from a sector number, a track number and a head number, said sector number, said track number and said head number uniquely locating said sector within the disk drive, said servo address identifying said sector within said track;

c) a transducing head positioned in relationship with said surface of said disk for reading sector addresses; and d) means for moving said head relative to said surface of said disk;

wherein said servo address is computed by:

1) adding a first integer to said head number to obtain a first result;

2) adding a second integer to said sector number to obtain a second result;

3) multiplying said first result and said second result to obtain a third result; and 4) adding said third result to said track number to obtain said servo address.

4. A disk drive for storing data, comprising:

a) a housing;

b) at least one disk rotatably mounted within said housing, said disk having
1) a surface for storing data,
2) a plurality of concentric tracks located on said surface,
3) at least one sector located within said track, and
4) a servo address computed from a sector number, a track number and a head number, said sector number, said track number and said head number uniquely locating said sector within the disk drive, said servo address identifying said sector within said track;

c) a transducing head positioned in relationship with said surface of said disk for reading sector addresses; and d) means for moving said head relative to said surface of said disk;

wherein said servo address is computed by:
1) adding one to said head number to obtain a first result;
2) adding one to said sector number to obtain a second result;
3) multiplying said first result and said second result to obtain a third result; and
4) adding said third result to said track number to obtain said servo address.

5. A disk drive for storing data, comprising:

a) a housing;

b) at least one disk rotatably mounted within said housing, said disk having
1) a surface for storing data,
2) a plurality of concentric tracks located on said surface,
3) at least one sector located within said track, and
4) a servo address computed from a sector number, a track number and a head number, said sector number, said track number and said head number uniquely locating said sector within the disk drive, said servo address identifying said sector within said track;

c) a transducing head positioned in relationship with said surface of said disk for reading sector addresses; and d) means for moving said head relative to said surface of said disk;

wherein said servo address is computed by:
1) adding a first integer to said sector number to obtain a first result; and
2) adding said first result to said track number to obtain said servo address.

6. A disk drive for storing data, comprising:

a) a housing;

b) at least one disk rotatably mounted within said housing, said disk having
1) a surface for storing data,
2) a plurality of concentric tracks located on said surface,
3) at least one sector located within said track, and
4) a servo address computed from a sector number, a track number and a head number, said sector number, said track number and said head number uniquely locating said sector within the disk drive, said servo address identifying said sector within said track;

c) a transducing head positioned in relationship with said surface of said disk for reading sector addresses; and d) means for moving said head relative to said surface of said disk;

wherein said servo address further comprises identifying means for identifying a first sector from said servo addresses within said track;

wherein said identifying means further comprises detecting means for detecting a non-uniform change in value of said servo address between adjacent sectors on each of said tracks, said non-uniform change indicating a transition between a last sector and a first sector of said track, said transition occurring once per said track.

* * * * *

UNITED STATES PATENT AND TRADEMARK OFFICE
CERTIFICATE OF CORRECTION

PATENT NO.   :   5,596,460
DATED        :   January 21, 1997
INVENTOR(S)  :   Richard Greenberg et al It is certified that error appears in the above-identified patent and that said Letters Patent is hereby corrected as shown below:

On the title page, item [56]: References Cited should also include:

| | | | |
|---|---|---|---|
| 4,633,345 | 12/86 | Keener | 360/77 |
| 4,984,100 | 01/91 | Takayama et al | 360/49 |
| 5,121,262 | 06/92 | Squires et al | 360/46 |
| 5,204,793 | 04/93 | Plonczak | 360/97.01 |
| 5,223,993 | 06/93 | Squires et al | 360/77.08 |
| 5,253,131 | 10/93 | Chavalier | 360/78.14 |
| 5,255,136 | 10/93 | Machado et al | 360/77.02 |
| 3254474 | 11/91 | Japan | G11B21/08 |

Signed and Sealed this

Twenty-second Day of April, 1997

Attest:

BRUCE LEHMAN

*Commissioner of Patents and Trademarks*

*Attesting Officer*